United States Patent
Sato

[19]

[11] Patent Number: 5,906,654
[45] Date of Patent: May 25, 1999

[54] ROUTE GUIDANCE FOR VEHICLE NAVIGATION APPARATUS TO FIND ALTERNATE DESTINATION

[75] Inventor: Kouichi Sato, Fukishima, Japan

[73] Assignee: Alpine Electronics, Inc., Japan

[21] Appl. No.: 08/751,463

[22] Filed: Nov. 19, 1996

[30] Foreign Application Priority Data

Jan. 18, 1996 [JP] Japan .................................... 8-024770

[51] Int. Cl.$^6$ ................................................. G06F 165/00
[52] U.S. Cl. ........................... 701/210; 701/200; 701/207; 701/209; 73/178 R
[58] Field of Search .................................... 701/200, 201, 701/202, 207–208, 209, 210, 211, 212, 216; 340/988, 990, 995; 73/178 R

[56] References Cited

U.S. PATENT DOCUMENTS

| | | | |
|---|---|---|---|
| 5,103,400 | 4/1992 | Yamada et al. .......................... | 701/202 |
| 5,231,584 | 7/1993 | Nimura et al. ........................... | 701/202 |
| 5,311,434 | 5/1994 | Tamai ....................................... | 701/210 |
| 5,359,527 | 10/1994 | Takanabe et al. ....................... | 701/209 |
| 5,748,107 | 5/1998 | Kersken et al. ......................... | 701/208 |

*Primary Examiner*—William A. Cuchlinski, Jr.
*Assistant Examiner*—Gertrude Arthur
*Attorney, Agent, or Firm*—Brinks Hofer, Gilson & Lione

[57] ABSTRACT

Route guidance for vehicle navigation in which a destination in a category of places is searched for and guidance along a suitable guide route to the destination is performed. If the user's original purpose cannot be achieved even after reaching the destination, another destination in the same category of places is automatically searched for and guidance to the new destination is performed along a suitable guide route. If e.g. the category is convenience stores, then convenience stores within a certain range of the user's vehicle position are searched to find the nearest destination. A guide route to the destination is found (excluding congested roads or roads under traffic control on the basis of road traffic information obtained e.g. from ATIS). If the vehicle moves out of a certain range of the destination without stopping longer than a certain time period after entering within the range, another destination in the same category of places is automatically searched for and the vehicle is guided along a suitable route to the new destination.

23 Claims, 5 Drawing Sheets

ROUTE GUIDANCE FOR VEHICLE NAVIGATION APPARATUS TO FIND ALTERNATE DESTINATION

BACKGROUND OF THE INVENTION

1. Field of the Invention

The present invention relates to vehicle navigation, and specifically to route guidance for vehicle navigation to one of a category of places.

2. Description of the Related Art

In general, a navigation apparatus installed in a motor vehicle has a map data storage device such as a compact disk read-only memory (CD-ROM) or an integrated circuit (IC) memory card in which map data is stored, a display unit, and vehicle movement detection devices, such as a gyroscope, a receiver in a global positioning system (GPS) and a vehicle speed sensor, for detecting a current position and a current heading of the vehicle. Map data containing the current position of the vehicle is read out from the map data storage device, a map image representing an area around the actual vehicle position is drawn on the display unit on the basis of the map data, and a vehicle position mark (indicating the location of the vehicle) is also displayed on the display unit by being superposed on the map image. As the vehicle travels, the map image scrolls or the vehicle position mark moves while the map image is fixed on the display, so the driver can recognize where he is currently travelling at a glance.

Ordinarily, this kind of vehicle navigation apparatus includes a route guidance function, enabling the driver to easily drive to a desired destination without deviating from a guide route. This route guidance function uses a process of automatically searching for a shortest route from a starting point to a destination by simulation calculation using the breadth-first search method, the Dijkstra method or other methods using map data, storing guide route data representing the shortest route thereby searched out, displaying on a display screen a corresponding map image in the form of a thick line or in a color different from the color in which other roads are displayed, and, when the vehicle is within a certain distance from an intersection where the heading of the vehicle is to be changed, displaying an arrow indicating the desired course together with a map image representing the intersection, thereby enabling the driver to easily understand the optimal route to the destination.

Map data stored in the map data storage device, e.g. a CD-ROM, is sectioned by suitable longitude and latitude widths at reduced scales, for example, 1/12500, 1/25000, 1/50000 and 1/100000. In the map data, data pertaining to roads is stored as sets of coordinates representing vertices (nodes) in terms of longitude and latitude. Each road is defined by two or more nodes connected to each other; a connection of two nodes is called a "link". The map data is (1) a road layer for map matching and route search, including a road list, a node table, an intersection forming node list and an intersection network list, (2) a background layer for displaying roads, buildings, facilities, parks, rivers and so on in map pictures, and (3) a letter/symbol layer for displaying letters representing names of entities such as cities, towns and villages, roads, intersections, and buildings as well as map symbols.

Further, a CD-ROM for map storage has recently become available in which facilities and stores, such as parking areas, convenience stores and public restrooms, are each recorded as an element of a category of similar places. When a user selects a destination in a category of places (e.g., convenience stores) in the navigation apparatus using such a CD-ROM, the navigation apparatus can search out a convenience store located near the user's present vehicle position, so as to display a corresponding shortest route to the convenience store on the display unit.

However, even if the nearest convenience store is reached via a suitable guide route, there is a possibility of e.g. the store being closed. Then the user must search for another similar destination by resetting the category of places. There is also a difficulty in performing suitable navigation for example, if traffic congestion occurs on the route, or passage on the guide route is inhibited by traffic control. Further, a driver may be unable to park his vehicle after arrival at a parking area searched out by the navigation apparatus, if no space is available in the parking area.

On the other hand, an advanced traffic information service (ATIS) system using cellular telephony and a vehicle information and communication system (VICS) using a radio signal beacon, a light beacon or frequency modulation multiplex broadcasting, have been developed as systems that externally transmit traffic information directly to vehicle navigation apparatuses. The ATIS system is already in practical use in certain countries. Information provided by the ATIS includes (1) traffic congestion information, (2) accident information, (3) road construction information, (4) road closing information, (5) ramp/interchange closing information, (6) parking area full/empty information, (7) traffic regulation enforcement information, (8) traffic control information, and (9) administration information. With respect to the VICS, substantially the same information service is planned.

A navigation apparatus using the ATIS displays a congested road, for example, in red in the map image. A driver using such a navigation apparatus can avoid involvement in traffic congestion by driving away from a congested road displayed on the display unit. However, even when a destination is reached by suitable route guidance, if the driver wishes to go to another destination, e.g. another convenience store, it is necessary for the driver to again perform the destination category setting process.

SUMMARY

In view of the above-described drawbacks of the prior art in accordance with the present invention, in route guidance for vehicle navigation, a destination in a selected category of places is searched for and guidance along a suitable guide route to the destination is performed. If the user even after reaching the destination decides it is not suitable, another destination in the same category of places is automatically searched for, and guidance to the new destination is provided along a suitable guide route.

In the present route guidance, current traffic information is obtained and guidance to a destination searched out from a category of places is performed along a guide route selected by avoiding traffic control, closed roads, accidents and congested roads, on the basis of the traffic information.

Also, if the category of places is parking areas, current traffic information is obtained, a destination in the category of places is searched for on the basis of the traffic information by excluding parking areas where no parking space is available, and guidance to a parking area where space is available is performed along a suitable guide route.

To achieve this, according to one aspect of the present invention, route guidance for vehicle navigation includes searching for a destination in a category of places, and displaying a guide route to the destination searched out on a display unit, where if a vehicle is within a certain distance of the destination and thereafter moves out of the certain distance without stopping longer than a certain time period, a second destination in the same category of places is searched for while the former destination is canceled, and then a guide route to the second destination searched out is displayed on the display unit.

In another aspect of the present invention, in the above-described route guidance, when the guide route is searched, traffic information from an external source is received, and the guide route is searched for by avoiding e.g. roads under traffic control, closed roads, accident roads, roads under construction and congested roads, on the basis of the received traffic information.

In still another aspect of the present invention, in the above-described route guidance, when parking areas are selected as the category of places to be searched, traffic information from the external source is received to obtain parking availability information on each of the parking areas, and a parking area to be selected as the destination is searched for by excluding those parking areas where no space is available.

According to the present invention, if the vehicle is within a certain range (e.g., 100 to 200 m) of a destination searched out from a category of places and if the vehicle moves out of that range of the destination without stopping longer than a certain time period (e.g., one minute), this destination is canceled and a new destination in the same category of places is automatically searched for. This is on the assumption that the intended purpose (shopping, parking for a substantially long time, etc.) has not been achieved at that destination, and another destination in the same category of places is then to be searched for. As a result, the driver is automatically guided to a new destination along a suitable guide route without performing the troublesome operation of resetting the category of places.

According to still another aspect of the present invention, when the guide route is searched for, traffic information is received from the external source (ATIS or the like), and the guide route is searched for by avoiding roads under traffic control, closed roads, accident roads, roads under construction and congested roads, on the basis of the received traffic information. Therefore, an optimal guide route is obtained according to the present road conditions.

According to a further aspect of the present invention, if the selected category of places is parking areas, the navigation apparatus obtains parking area availability information from the above-mentioned traffic information, and searches for a destination by excluding those parking areas having no parking space available, thereby finding a parking area where the vehicle can be parked. According to the present invention, if the vehicle is not parked in this parking area, the category of places is again searched by excluding that parking area, to find another parking area where the vehicle can be parked. Thus the need for the user operation of resetting the category of places is eliminated.

DETAILED DESCRIPTION

Figure 1:
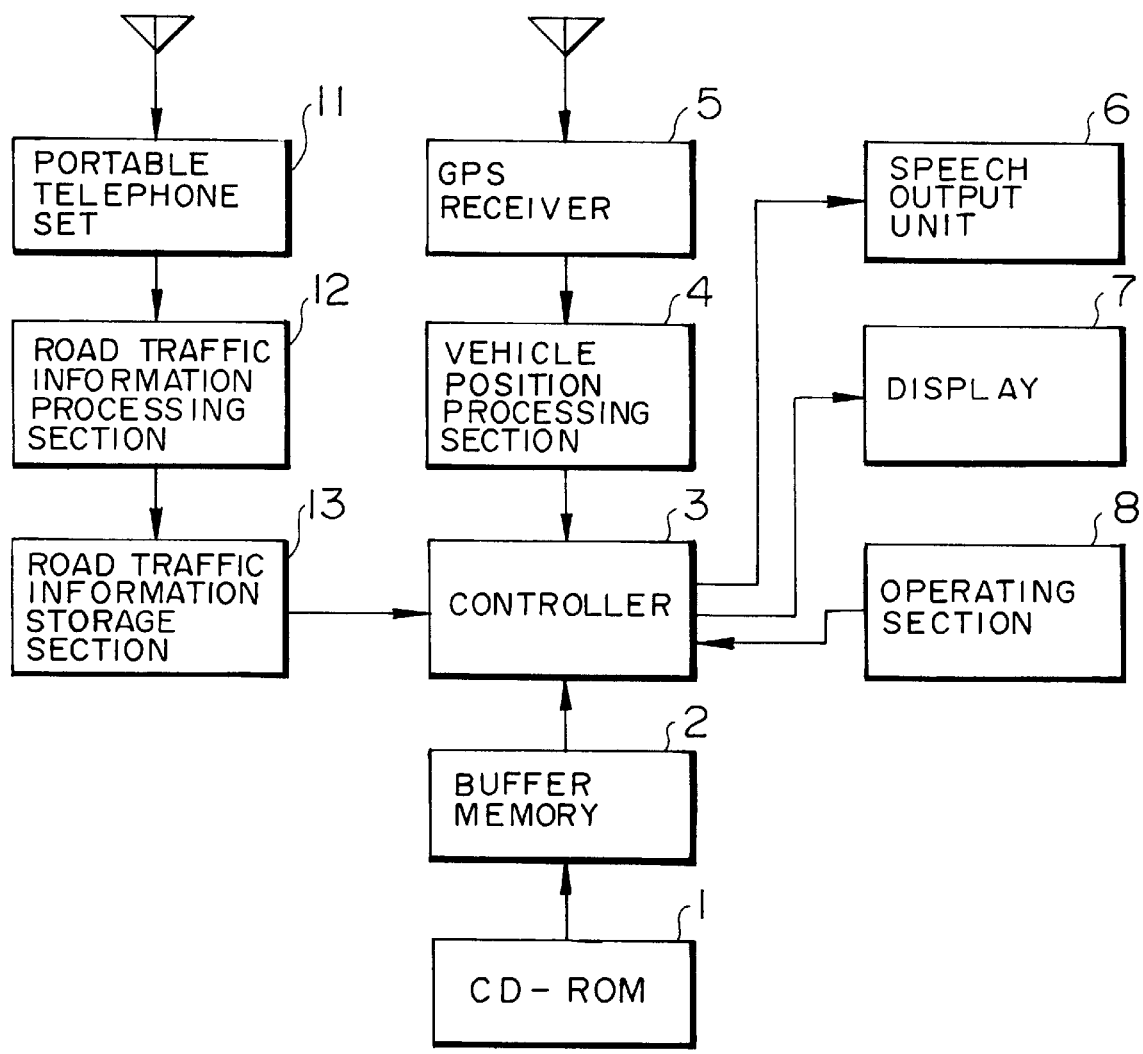
FIG. 1 is a block diagram of a vehicle navigation apparatus for guidance along a route to a destination in a category of places, in accordance with the present invention.

FIG. 1 is a block diagram of a navigation apparatus for use with a motor vehicle or the like for guidance along a guide route to a destination in one of a plurality of categories of places, in accordance with the present invention. Map data in the form of a road layer, a background layer, a letter/symbol layer is recorded on a CD-ROM 1. Map data read out from the CD-ROM 1 is temporarily stored in a buffer memory 2. A GPS receiver 5 receives satellite navigation signals from a plurality of satellites. (Dead reckoning may be used with or instead of GPS position finding.) A vehicle position processing section 4 detects the present position, heading and speed of the vehicle from an output signal of the GPS receiver 5.

A speech output unit 6 outputs various kinds of information from the system in the form of speech to the driver (user). For example, when the vehicle approaches an intersection at which a right turn is to be made, the speech output unit 6 tells the driver to "turn right". A display unit 7 displays a map image together with a vehicle mark and a guide route. An operating section 8 has a keypad for inputting the destination and selecting a destination category of places.

A cellular telephone 11 connects the navigation apparatus to a traffic information center (e.g. ATIS) to receive road traffic information of traffic congestion, accidents, construction, traffic control, etc. from the traffic information center. (Alternately the system receives detailed broadcast traffic data.) Road traffic information processing section 12 extracts information received by the cellular telephone 11. The road traffic information processing section 12 is connected to the telephone 11 through an adapter. Road traffic information storage section 13 stores road traffic information output from the road traffic information processing section 12. When new road traffic information is received from the traffic information center, the road traffic information stored in the road traffic information storage section 13 is updated (replaced) by the new information.

Controller 3 is supplied with the present position, heading and speed of the vehicle from the vehicle position processing section 4, reads out map data pertaining to an area in the vicinity of the vehicle position from the buffer memory 2, and displays an image of this area on the display unit 7, together with the vehicle mark. Also, the controller 3 displays a congested road, for example in red, on the basis of road traffic information obtained from the road traffic information storage section 13, obtains a shortest guide route to a destination by simulation calculation of the breadth-first search method, the Dijkstra method, etc., and performs guidance along the guide route by displaying on the map image the guide route, e.g. in a color different from the color in which other roads are displayed. Further, the controller 3 searches for a guide route to a destination in one of the categories in response to a signal supplied by an operation of the operating section 8.

An embodiment of guidance along a route to a destination in any one of a plurality of categories of places by using this navigation apparatus in accordance with the present invention will now be described.

Figure 2:
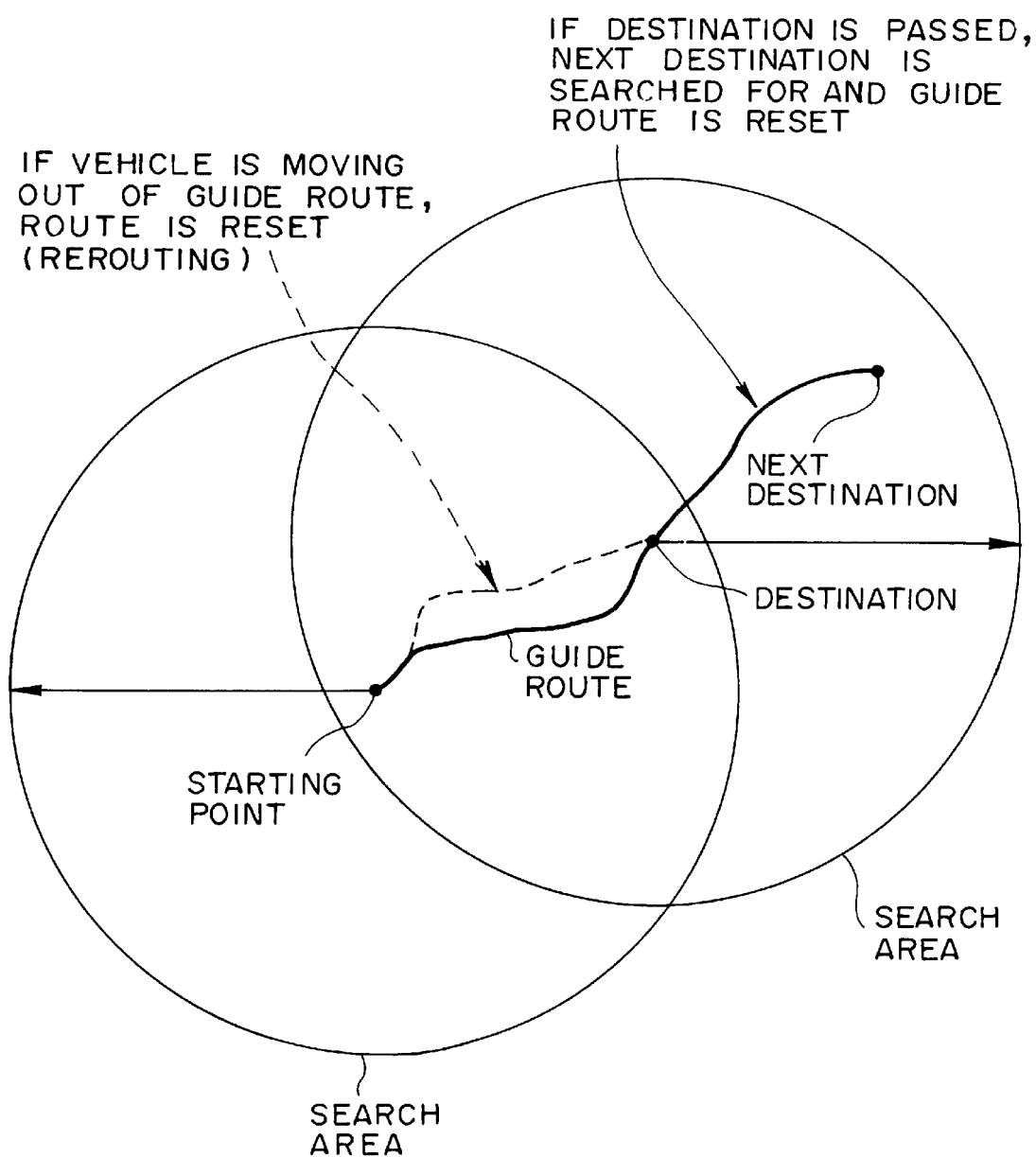
FIG. 2 is a diagram of a first embodiment of route guidance to a destination in a category of places.
Figure 3:
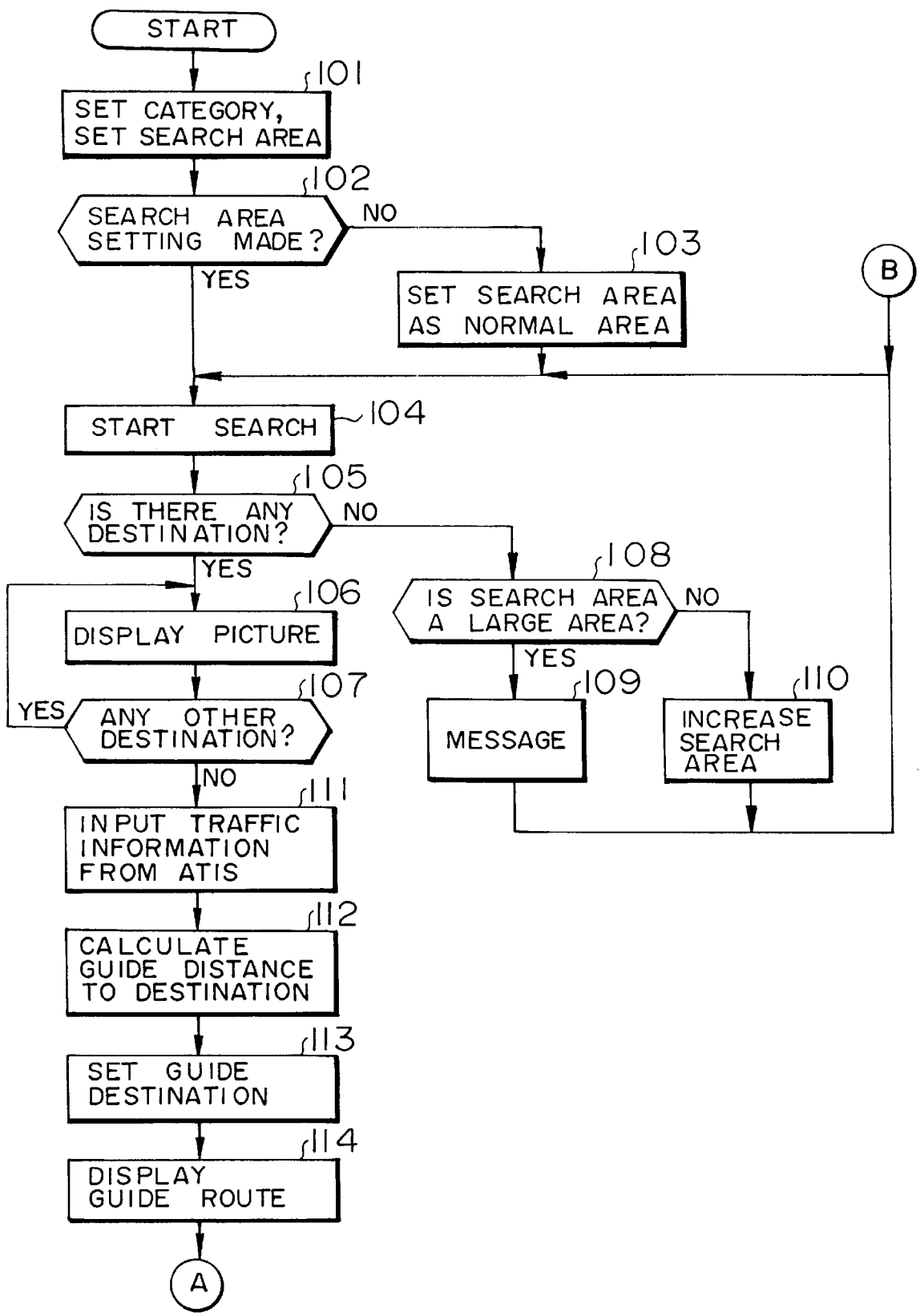
FIG. 3 is a flow chart of the first embodiment of the route guidance method (Part 1)
Figure 4:
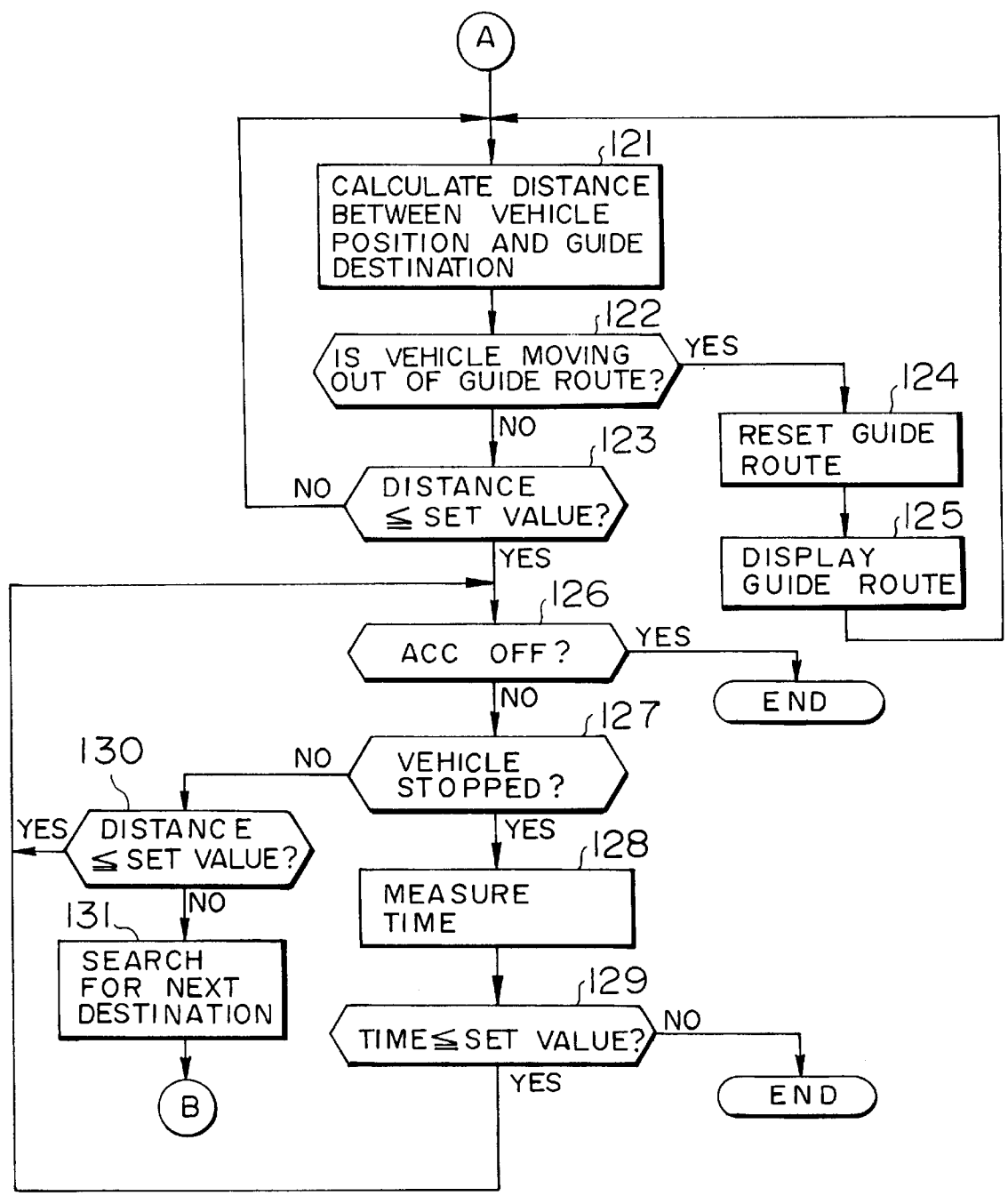
FIG. 4 is a flow chart of the first embodiment of the route guidance method (Part 2)
Figure 5:
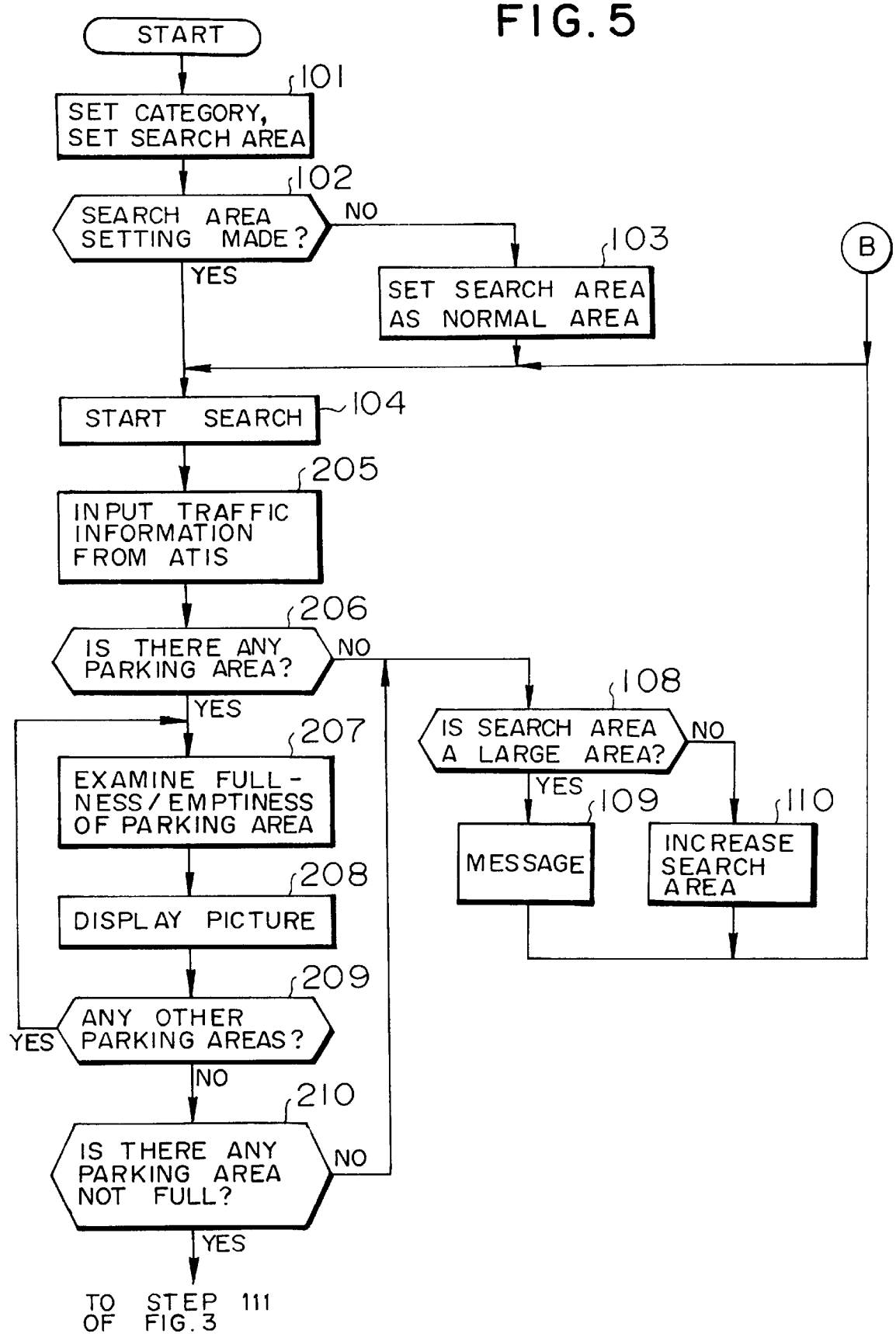
FIG. 5 is a flow chart of a second embodiment of route guidance to a destination in a category of places.

FIG. 2 is a diagram of this embodiment, and FIGS. 3 and 4 are flow charts of processing in accordance with this embodiment. It is to be appreciated that the flowcharts of FIGS. 3, 4 and 5 represent only a small portion of a computer program (computer code) which is executed by a microprocessor or microcontroller which is part of the apparatus of FIG. 1 and stored in a computer readable memory associated with the apparatus. The actual computer code (software) is not shown since such can easily be written in light of the present disclosure by one of ordinary skill in the art. The computer program can be written in a variety of computer languages. Thus FIGS. 3, 4 and 5 are a representation of steps in a computer program to be executed by the apparatus that is only a small portion of the total program carried out by the apparatus.

A case where "convenience stores" is a category of places to be searched for is described. Other exemplary categories are banks, motor vehicle dealers, public restrooms, supermarkets, department stores, game centers, pinball parlors, beaches, skiing areas, railroad stations, hotels, family restaurants, Japanese-style restaurants, etc. The same method as for guidance to convenience stores is used for guidance to a destination in any of these categories.

First, in step 101 after the start step, one of the categories of places from which a destination is to be selected is chosen. That is, the user operates the operating section 8 to display a category search picture on the display unit 7, and selects the category "convenience store" from the various categories of places shown on the display. The user then selects a search area if necessary. For example, a search area is selected from a "large area" for search within a 10 km radius from the current vehicle position, a "normal area" for search within a 5 km radius from the current vehicle position and a "small area" for search within a 1 km radius from the current vehicle position.

After choosing a destination category, the navigation apparatus checks whether a search area has been selected in step 102. If no search area is selected, the process step 103 selects the normal search area, and then goes to step 104. If a search area is selected in step 102, the process goes directly from step 102 to step 104. In step 104, a category search in the search area is started from a starting point corresponding to the current vehicle position. That is, the controller 3 reads out map data on an area in the vicinity of the present vehicle position from the CD-ROM 1, and checks data in the read data corresponding to the selected search area to determine whether a convenience store is in the search area.

If no convenience store is found in the search area, the process goes to step 108 to determine whether the selected search area is the large area. If not, the process goes to step 110 to enlarge the search area one rank. The process then returns to step 104 to again search for a destination. If it is determined in step 108 that the selected search area is the large area, the process goes to step 109 to provide the message output from the speech output unit 6 informing the user that no convenience store is found nearby, and to display this result on the display unit 7. The process then returns to step 104 to continue searching for a destination.

If a destination is found in step 105, the process goes to step 106 to display the position of the destination by superposing it on the map image on the display unit 7. Thereafter, in step 107, the selected area is searched for another convenience store. If another convenience store is found, the process goes to step 106 to display the position of the convenience store on the display unit 7.

When searching is completed for all the convenience stores in the selected area in this manner, the process goes from step 107 to step 111 to input the traffic information (e.g. from the ATIS) stored in the road traffic information storage section 13. Thereafter, in step 112, the guidance distance to each convenience store is calculated by one of the breadth-first search method, the Dijkstra method, etc. In this case, closed roads, roads under construction, other roads where traffic is limited and congested roads are excluded from the route search. In step 113, the destination closest to the present vehicle position is set as the guidance destination. In step 114, a guide route to the guidance destination is displayed on the display unit 7.

Thereafter in step 121, the navigation apparatus calculates the distance between the guidance destination and the present vehicle position supplied from the vehicle position processing section 4. In step 122, the navigation apparatus detects, on the basis of the output signal from the vehicle position processing section 4, whether the vehicle is departing from the guide route. If the vehicle is so departing, the process goes to step 124 to search for a new guide route from a starting point corresponding to the current vehicle position to the destination, as indicated by the broken line in FIG. 2. At this time, the traffic information from the ATIS is used to search for a guide route. In step 125, a guide route thereby searched out is displayed by being superposed on the map image on the display unit 7. The process then returns to step 121.

If it is determined in step 122 that the vehicle is travelling along the guide route, the process goes to step 123 to determine whether the distance to the destination is equal to or less than a certain value (e.g. 100 to 200 m; 100 m in one embodiment). If the vehicle is outside a range of 100 m from the destination, the process returns to step 121. If the vehicle is within 100 m of the destination, the process goes to step 126 to determine whether the vehicle accessory (ACC) power supply to the navigation apparatus is off. If the ACC power supply is off, guidance along the route is terminated because presumably the driver has stopped the vehicle at the destination.

If it is determined in step 126 that the ACC power supply is not off, the process goes to step 127 to determine whether the vehicle is stopped, on the basis of a signal from the vehicle position processing section 4. If the vehicle is stopped, the process goes to step 128 to measure the stopping time period. Then, in step 129, if the stopping time period is longer than a certain time period (e.g. one minute), it is determined that the destination has been reached. The process is then terminated.

If in step 129 the vehicle stopping time is not longer than one minute, the process returns to step 126.

If it is determined in step 127 that the vehicle has not stopped, the process goes to step 130 to calculate the distance between the guidance destination and the vehicle position. If the distance between the guidance destination and the vehicle is not greater than 100 m, the process returns to step 126. If the distance is larger than the set value (100 m), the process goes to step 131. In step 131, it is assumed that the user's purpose has not been achieved, e.g. the store is closed or for other reasons. Then the present guidance destination as a search object is canceled, and searching for the next destination starts, as shown in FIG. 2. That is, the process returns to step 104.

In this embodiment, as described above, when one of a destination category of places is selected, a destination in that category which can be reached from the present vehicle position in the shortest time period is found as a guidance destination and a guide route to the guidance destination is displayed on the display unit 7. Thereafter, a search is automatically made for the next destination and a guide route to the next destination is displayed, unless the vehicle stops for a certain time period or the ACC power supply is turned off after arrival at the guidance destination. Therefore, it is not necessary for the user to again start searching for a new destination by setting the corresponding category of places, for example, in a case where the guidance destination store is closed and hence the user's original purpose (shopping) cannot be achieved. Thus the navigation apparatus is rendered easier to operate.

FIG. 5 is a flow chart of a second embodiment of guidance along a route to a destination in one of a plurality of categories of places, in accordance with the present invention. In this embodiment, "parking areas" is one category of places.

First, in step 101, one of the categories of places from which a destination is to be chosen is selected, as in the first embodiment. Also, the user selects a search area from one of large, normal and small search areas if necessary.

In step 102, the navigation apparatus determines whether a search area has been selected. If no search area is selected, the process goes to step 103 to select the normal search area, and then goes to step 104. If a selected search area is recognized in step 102, the process goes directly from step 102 to step 104. In step 104, a category search in the search area starts. That is, the controller 3 reads out map data pertaining to an area in the vicinity of the present vehicle position from the CD-ROM 1.

Next, in step 205, the navigation apparatus receives parking area availability information in the road traffic information (from the ATIS) stored in the road traffic information storage section 13. In step 206, a check is made as to whether there is any parking area in the selected search area. If there is no parking area in the selected search area, the process goes to step 108 to determine whether the selected search area is the large area. If not, the process goes to step 110 to enlarge the search area one rank. The process then returns to step 104 to again search for a parking area. If it is determined in step 108 that the selected search area is the large area, the process goes to step 109 to output from the speech output unit 6 a message informing the user of the result that no parking area is found nearby, and to display this result on the display unit 7. The process then returns to step 104 to continue searching for a parking area.

If a parking area is searched out in step 206, the process goes to step 207 to determine whether no space is available or space is available (full/emptiness) in the parking area. Then, in step 208, the state of the parking area is displayed by being superposed on the map image on the display unit 7. For example, the parking area is displayed in red if no space is available, or in blue if space is available.

Thereafter in step 209, the selected search area is searched for another parking area. If another parking area is found, the process goes to step 207. When the search is completed for all the parking areas in the selected search area in this manner, the process goes from step 209 to step 210 to determine whether space is available in some of the parking areas. If there is no parking area where space is available, the process goes to step 108 to determine whether the selected search area is the large area. If the selected area is the large area, the process goes to step 109 to output from the speech output unit 6 a message informing the user of the result that there is no parking area where space is available and/or to display this result on the display unit 7.

If space is available in some of the parking areas, the process goes to step 111 of FIG. 3, followed by the same processing as in the first embodiment, not again described. Also in this embodiment, if the vehicle enters within a range e.g. of 100 m of the destination parking area and if it then travels away from the parking area by a distance greater than 100 m without stopping within the 100 m range for a time longer than e.g. one minute, it is assumed that the original purpose has not been achieved. The process then returns to step 104 to continue searching for another parking area, where space is available.

In this embodiment, as described above, parking area availability information and road information (e.g. traffic control, closed roads, construction, traffic congestion) are input e.g. from the ATIS and a guide route to a parking area where space is available and which can be reached from the present vehicle position in the shortest time is selected and displayed on the display unit 7, according to both kinds of information. Therefore, the driver can reach the parking area in a short time by driving along the guide route. Also, if the vehicle is not parked in the parking area after arrival at the parking area for some reason, another parking area that is not full is automatically searched out and the vehicle is guided to the new parking area. Thus, the need for the troublesome user operation of redoing the guide route search by resetting the category of places is eliminated.

According to the present invention, as described above, if the vehicle is within a certain range of a destination and if it then travels out of the range of the destination without stopping within the range longer than a certain time, this destination is canceled and another destination in the same category of places is then automatically searched for. In this manner, a guide route to another destination in the same category of places can be indicated even if the user's original purpose cannot be achieved, e.g. because the guide destination store is closed or for other reasons, thereby eliminating the need for the user operation of resetting the category of places.

In particular, in a case where a guide route is searched for by inputting traffic information from the ATIS or the like, a guide route search is performed by avoiding roads under traffic control and congested roads. It is therefore possible to reach the desired destination in the shortest time by driving along the guide route set by the navigation apparatus. Further, if a parking area is searched for as a destination, pertinent parking availability information is input from the above-described traffic information, thus making it possible to search out a parking area where space is available.

This disclosure is illustrative and not limiting; further modifications will be apparent to one skilled in the art in light of this disclosure, and are intended to fall within the scope of the appended claims.

What is claimed:

1. A vehicle route guidance method for a navigation apparatus comprising the steps of:

searching for a destination in a category of destinations; and displaying a guide route to the searched destination;

wherein, upon entering within a certain range of the destination and thereafter moving out of the certain range, automatically searching for another destination in the category; and displaying a guide route to the another destination.

2. A method according to claim 1, further comprising:

in the first step of searching, finding a destination in the category nearest to a current vehicle position.

3. A method according to claim 1, further comprising:

terminating route guidance if the vehicle is within a predetermined distance of the destination and if a vehicle ACC power is off.

4. A method according to claim 1, further comprising:

terminating route guidance if the vehicle is within a predetermined distance of the destination, if vehicle ACC power is on, and if the vehicle is stopped longer than a predetermined time.

5. A method according to claim 1, further comprising:

receiving transmitted traffic information; and searching for the guide route on the basis of the received traffic information.

6. A vehicle route guidance method for a navigation apparatus comprising the steps of:

searching for parking areas as a category of places; and displaying a guide route to a searched out parking area;

wherein upon entering within a certain range of the parking area and thereafter moving out of the certain range, automatically searching for another parking area; and displaying a guide route to the another parking area.

7. A method according to claim 6, further comprising:

receiving transmitted traffic information to obtain parking availability information on the parking areas; and in the step of searching, searching for parking areas where space is available.

8. A method according to claim 7, further comprising:

displaying a guide route to one of the parking areas where space is available and which can be reached in a shortest time from a current vehicle position.

9. A method according to claim 7, further comprising:

if the vehicle moves out of said range without stopping longer than a certain time after reaching the destination parking area, searching for another parking area where space is available; and displaying a guide route thereto.

10. A method according to claim 7, further comprising:

if the vehicle has not parked in the destination parking area, searching for another parking area.

11. A method according to claim 7, further comprising:

displaying a parking area where no space is available and a parking area where space is available in different colors.

12. A method according to claim 7, further comprising:

if no parking area is in a selected area with space available, enlarging the selected area; and searching for a parking area where space is available.

13. A method according to claim 7, further comprising:

if a maximum selected area is searched and no parking area is found having space available, displaying that no parking area has space available.

14. A method according to claim 7, further comprising:

if a maximum selected area is searched and no parking area having space available is found, outputting a spoken message indicating that no parking area has space available.

15. A vehicle route guidance method for a navigation apparatus comprising the steps of:

selecting a search area;

searching for a destination in a category of places within the search area; and displaying a guide route to the destination;

wherein, if a vehicle enters within a certain range of the destination and thereafter moves out of the certain range, automatically searching for another destination in the category of places; and displaying a guide route to the another destination.

16. A method according to claim 15, further comprising:

setting a destination nearest to a current vehicle position as a guidance destination; and in the step of displaying, displaying a guide route to the guidance destination.

17. A method according to claim 15, further comprising:

selecting a size of the area.

18. A method according to claim 15, further comprising:

if no destination in the category of places is found in the area, enlarging the area; and searching for another destination.

19. A method according to claim 15, further comprising:

if a maximum area is searched and no destination in the category of places is found, indicating that there is no such destination.

20. A method according to claim 15, further comprising:

if a maximum area is searched and no destination in the category of places is found, outputting a spoken message indicating that there is no such destination.

21. A vehicle navigation apparatus comprising:

means for searching for a destination in a category of destinations; and a display for displaying a guide route to the searched destination;

wherein, upon the vehicle entering within a certain range of the destination and thereafter moving out of the certain range, another destination in the category is automatically searched for; and wherein a guide route to the another destination searched out is displayed on the display.

22. A vehicle navigation apparatus comprising:

means for searching for parking areas as a destination category of places; and a display for displaying a guide route to a searched parking area;

wherein upon the vehicle entering within a certain range of the parking area and thereafter moving out of the certain range, another parking area is automatically searched for; and wherein a guide route to the another parking area is displayed on the display.

23. A vehicle navigation apparatus comprising:

means for selecting a search area;

means for searching for a destination in a category of places within the search area; and a display for displaying a guide route to the destination;

wherein, if the vehicle enters within a certain range of the destination and thereafter moves out of the certain range, another destination in the category of places is automatically searched for and a guide route to the another destination is displayed.

* * * * *